(12) United States Patent
Childs

(10) Patent No.: US 11,005,334 B2
(45) Date of Patent: May 11, 2021

(54) ANNULAR MEMBER, METHOD, AND ASSEMBLY FOR COMPONENT DISPLACEMENT CONTROL

(71) Applicant: SAINT-GOBAIN PERFORMANCE PLASTICS RENCOL LIMITED, Coventry (GB)

(72) Inventor: Thomas Childs, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 67 days.

(21) Appl. No.: 16/220,464

(22) Filed: Dec. 14, 2018

(65) Prior Publication Data

US 2019/0190345 A1    Jun. 20, 2019

Related U.S. Application Data

(60) Provisional application No. 62/599,342, filed on Dec. 15, 2017.

(51) Int. Cl.
| | |
|---|---|
| *H02K 5/24* | (2006.01) |
| *H02K 1/18* | (2006.01) |
| *B32B 15/04* | (2006.01) |
| *B62D 5/04* | (2006.01) |
| *F16F 1/36* | (2006.01) |

(Continued)

(52) U.S. Cl.
CPC .............. *H02K 5/24* (2013.01); *B32B 15/046* (2013.01); *B62D 5/0403* (2013.01); *F16F 1/3605* (2013.01); *F16F 1/3732* (2013.01); *F16F 1/38* (2013.01); *H02K 1/185* (2013.01); *F16F 2224/02* (2013.01); *F16F 2224/025* (2013.01); *F16F 2224/0208* (2013.01); *F16F 2224/0225* (2013.01); *F16F 2234/02* (2013.01); *H02K 2213/03* (2013.01)

(58) Field of Classification Search
CPC .... B32B 15/046; B62D 5/0403; H02K 1/185; H02K 2213/03; H02K 5/24; F16C 11/04
USPC ....................................... 310/51, 89
See application file for complete search history.

(56) References Cited

U.S. PATENT DOCUMENTS

| | | | |
|---|---|---|---|
| 1,469,880 | A | 10/1923 | Bowden |
| 2,386,951 | A | 10/1945 | Howe |

(Continued)

FOREIGN PATENT DOCUMENTS

| | | |
|---|---|---|
| BR | PI9201846 A | 1/1993 |
| CA | 2526653 A1 | 12/2004 |

(Continued)

OTHER PUBLICATIONS

International Search Report and Written Opinion for PCT/EP2018/084911, dated Mar. 15, 2019, 13 pages.

(Continued)

*Primary Examiner* — Tulsidas C Patel
*Assistant Examiner* — Rashad H Johnson
(74) *Attorney, Agent, or Firm* — Abel Schillinger, LLP; Chi Suk Kim

(57) ABSTRACT

An electric motor or generator assembly includes a stator, a housing, and an annular member fit between the stator and the housing, where the annular member is radially compressed so as to exert a radial force outward onto the housing and inward onto the stator to maintain a positional relationship therebetween.

18 Claims, 4 Drawing Sheets

(51) Int. Cl.
*F16F 1/373* (2006.01)
*F16F 1/38* (2006.01)

(56) References Cited

U.S. PATENT DOCUMENTS

| | | | |
|---|---|---|---|
| 2,865,692 A | 12/1958 | Gossmann | |
| 3,061,386 A | 10/1962 | Dix et al. | |
| 3,094,376 A | 6/1963 | Thomas | |
| 3,142,887 A | 8/1964 | Hülck et al. | |
| 3,438,660 A | 4/1969 | Steiner | |
| 3,465,188 A | 9/1969 | Sisk | |
| 3,633,398 A | 1/1972 | Koch | |
| 3,700,271 A | 10/1972 | Blaurock et al. | |
| 3,747,997 A | 7/1973 | Winn | |
| 3,838,928 A | 10/1974 | Blaurock et al. | |
| 4,072,368 A | 2/1978 | Ehrentraut | |
| 4,079,168 A | 3/1978 | Schwemmer et al. | |
| 4,083,622 A | 4/1978 | Neidecker | |
| 4,286,894 A | 9/1981 | Rongley | |
| 4,617,484 A | 10/1986 | Buijsen | |
| 4,647,803 A | 3/1987 | von der Heide et al. | |
| 4,790,683 A | 12/1988 | Cramer, Jr. et al. | |
| 4,800,623 A | 1/1989 | Brockhaus | |
| 4,828,423 A | 5/1989 | Cramer, Jr. et al. | |
| 4,889,772 A | 12/1989 | Bergmann et al. | |
| 4,916,026 A | 4/1990 | Bergmann et al. | |
| 4,932,795 A | 6/1990 | Guinn | |
| 4,981,390 A | 1/1991 | Cramer, Jr. et al. | |
| 5,003,212 A | 3/1991 | Ibe et al. | |
| 5,056,937 A | 10/1991 | Tanaka et al. | |
| 5,062,721 A | 11/1991 | Chiba | |
| 5,193,917 A | 3/1993 | Adler et al. | |
| 5,241,229 A | 8/1993 | Katakura et al. | |
| 5,305,654 A | 4/1994 | Durham | |
| 5,328,160 A | 7/1994 | McLaughlin | |
| 5,609,421 A | 3/1997 | Schulze-Eyssing et al. | |
| 5,619,389 A | 4/1997 | Dunfield et al. | |
| 5,633,086 A | 5/1997 | Hsu et al. | |
| 5,803,614 A | 9/1998 | Tsuji et al. | |
| 5,878,851 A | 3/1999 | Carlson et al. | |
| 5,885,006 A | 3/1999 | Sheedy | |
| 5,906,029 A | 5/1999 | Fox | |
| 5,939,215 A | 8/1999 | Andler | |
| 5,964,474 A | 10/1999 | Chen | |
| 6,018,441 A | 1/2000 | Wu et al. | |
| 6,023,903 A | 2/2000 | Stecker | |
| 6,086,257 A | 7/2000 | Lee | |
| 6,114,040 A | 9/2000 | Gebregiorgis et al. | |
| 6,178,639 B1 | 1/2001 | Lytwynec et al. | |
| 6,186,027 B1 | 2/2001 | Nielsen | |
| 6,228,471 B1 | 5/2001 | Neerinck et al. | |
| 6,288,878 B1 | 9/2001 | Misso et al. | |
| 6,294,597 B1 | 9/2001 | Rinde et al. | |
| 6,318,898 B1 | 11/2001 | Ward et al. | |
| 6,321,712 B1 | 11/2001 | Havel | |
| 6,333,839 B1 | 12/2001 | Misso et al. | |
| 6,411,472 B1 | 6/2002 | Allsup | |
| 6,428,744 B1 | 8/2002 | Takayama et al. | |
| 6,480,363 B1 | 11/2002 | Prater | |
| 6,499,209 B1 | 12/2002 | Landin et al. | |
| 6,512,314 B1 | 1/2003 | Nakanishi | |
| 6,516,940 B1 | 2/2003 | Hart et al. | |
| 6,527,449 B1 | 3/2003 | Koyama et al. | |
| 6,567,266 B2 | 5/2003 | Ives et al. | |
| 6,572,270 B2 | 6/2003 | Takemura et al. | |
| 6,603,634 B1 | 8/2003 | Wood et al. | |
| 6,606,224 B2 | 8/2003 | MacPherson et al. | |
| 6,740,428 B2 | 5/2004 | Norito et al. | |
| 6,754,046 B2 | 6/2004 | Barina et al. | |
| 6,755,746 B2 | 6/2004 | Barnley et al. | |
| 6,889,956 B2 | 5/2005 | Gutierrez et al. | |
| 6,905,779 B2 | 6/2005 | Sakai et al. | |
| 7,007,386 B1 | 3/2006 | Stover | |
| 7,085,108 B1 | 8/2006 | Oveyssi et al. | |
| 7,118,808 B2 | 10/2006 | Wölki et al. | |
| 7,367,107 B1 | 5/2008 | Fruge et al. | |
| 7,580,225 B2 | 8/2009 | Hanrahan et al. | |
| 7,742,676 B2 | 6/2010 | Tilliette et al. | |
| 7,913,835 B2 | 3/2011 | Gautier et al. | |
| 7,922,418 B2 | 4/2011 | Baker et al. | |
| 7,957,103 B2 | 6/2011 | Woodhead et al. | |
| 7,958,637 B2 | 6/2011 | Hughes | |
| 8,033,733 B2 | 10/2011 | Lang | |
| 8,228,640 B2 | 7/2012 | Woodhead et al. | |
| 8,282,308 B2 * | 10/2012 | Slayne | F16B 19/02 403/372 |
| 8,684,624 B2 * | 4/2014 | Slayne | F16D 1/0835 403/365 |
| 9,062,700 B2 * | 6/2015 | Pennsiriwongse | F16D 1/0835 |
| 2002/0024770 A1 | 2/2002 | Hong et al. | |
| 2002/0039461 A1 | 4/2002 | Obara et al. | |
| 2002/0097937 A1 | 7/2002 | Obara | |
| 2002/0118490 A1 | 8/2002 | MacPherson et al. | |
| 2002/0123608 A1 | 9/2002 | Howard, III | |
| 2002/0172836 A1 | 11/2002 | Takayama et al. | |
| 2003/0150140 A1 | 8/2003 | Takayama et al. | |
| 2004/0057643 A1 | 3/2004 | Blanchard et al. | |
| 2004/0076356 A1 | 4/2004 | Kapaan et al. | |
| 2004/0157750 A1 | 8/2004 | Danly, Sr. et al. | |
| 2004/0178872 A1 | 9/2004 | Mogi et al. | |
| 2004/0246627 A1 | 12/2004 | Durrum et al. | |
| 2005/0018936 A1 | 1/2005 | Yoshimura et al. | |
| 2005/0051975 A1 | 3/2005 | Takayama et al. | |
| 2005/0070365 A1 | 3/2005 | Riefe et al. | |
| 2005/0077101 A1 | 4/2005 | Yamamoto et al. | |
| 2005/0181216 A1 | 8/2005 | Nakanishi et al. | |
| 2005/0225903 A1 | 10/2005 | Sprankle et al. | |
| 2006/0165973 A1 | 7/2006 | Dumm et al. | |
| 2006/0177685 A1 | 8/2006 | Matsuda et al. | |
| 2006/0181811 A1 | 8/2006 | Hanrahan et al. | |
| 2006/0214341 A1 | 9/2006 | Sugiura et al. | |
| 2006/0228174 A1 | 10/2006 | Woodhead et al. | |
| 2006/0245675 A1 | 11/2006 | Lang | |
| 2006/0275076 A1 | 12/2006 | Hanrahan et al. | |
| 2006/0276246 A1 | 12/2006 | Needes et al. | |
| 2007/0000680 A1 | 1/2007 | Adachi et al. | |
| 2007/0291417 A1 | 12/2007 | Woodhead et al. | |
| 2008/0028591 A1 | 2/2008 | Hughes | |
| 2008/0043375 A1 | 2/2008 | Hanrahan et al. | |
| 2008/0129044 A1 | 6/2008 | Carcagno et al. | |
| 2008/0160300 A1 | 7/2008 | Hwang et al. | |
| 2008/0199254 A1 * | 8/2008 | Baker | F16C 27/00 403/372 |
| 2008/0218008 A1 | 9/2008 | Ghasripoor et al. | |
| 2008/0267693 A1 * | 10/2008 | Court | F16D 1/0835 403/14 |
| 2009/0068473 A1 | 3/2009 | Van Wessel et al. | |
| 2009/0238504 A1 | 9/2009 | Suzuki et al. | |
| 2009/0256341 A1 * | 10/2009 | Okada | B62D 1/181 280/775 |
| 2010/0003076 A1 | 1/2010 | Slayne | |
| 2010/0126823 A1 | 5/2010 | Gautier et al. | |
| 2010/0321832 A1 | 12/2010 | Woodhead et al. | |
| 2010/0321833 A1 | 12/2010 | Woodhead et al. | |
| 2010/0323804 A1 | 12/2010 | Himmelmann | |
| 2011/0049834 A1 | 3/2011 | Natu | |
| 2011/0076096 A1 * | 3/2011 | Slayne | F16C 27/02 403/372 |
| 2011/0271512 A1 | 11/2011 | Hughes | |
| 2012/0240350 A1 | 9/2012 | Natu et al. | |
| 2013/0315654 A1 * | 11/2013 | Nias | F16D 1/0835 403/119 |
| 2014/0161519 A1 | 6/2014 | Slayne et al. | |
| 2014/0205374 A1 * | 7/2014 | Nias | F16D 9/06 403/367 |
| 2015/0000098 A1 * | 1/2015 | Slayne | G11B 5/4813 29/428 |
| 2015/0093066 A1 * | 4/2015 | Speicher | B32B 37/185 384/625 |
| 2015/0114549 A1 | 4/2015 | Slayne et al. | |

(56) References Cited

U.S. PATENT DOCUMENTS

FOREIGN PATENT DOCUMENTS

| | | |
|---|---|---|
| CN | 1126286 A | 7/1996 |
| CN | 1402871 A | 3/2003 |
| CN | 1446294 A | 10/2003 |
| CN | 1459007 A | 11/2003 |
| CN | 101122304 A | 2/2008 |
| CN | 101255884 A | 9/2008 |
| CN | 102630281 A | 8/2012 |
| CN | 103891101 A | 6/2014 |
| CN | 105782340 A | 7/2016 |
| DE | 1872950 | 5/1963 |
| DE | 50166 A1 | 10/1966 |
| DE | 2409856 A1 | 9/1975 |
| DE | 3248148 | 7/1984 |
| DE | 4114643 C2 | 12/1995 |
| DE | 19915417 A1 | 10/1999 |
| DE | 10027513 A1 | 12/2001 |
| EP | 0507544 A1 | 10/1992 |
| EP | 0514329 A2 | 11/1992 |
| EP | 0554144 A1 | 8/1993 |
| EP | 0514329 B1 | 9/1995 |
| EP | 1164300 A1 | 12/2001 |
| EP | 1302684 A1 | 4/2003 |
| EP | 1302685 A1 | 4/2003 |
| EP | 1305530 B1 | 5/2003 |
| EP | 1568437 A2 | 8/2005 |
| EP | 1754646 A2 | 2/2007 |
| EP | 1886895 A1 | 2/2008 |
| EP | 2009145 A1 | 12/2008 |
| EP | 2012025 A1 | 1/2009 |
| FR | 2803126 A1 | 6/2001 |
| FR | 2803127 A1 | 6/2001 |
| FR | 2803129 A1 | 6/2001 |
| GB | 195795 A | 4/1923 |
| GB | 414631 | 5/1933 |
| GB | 703563 | 2/1954 |
| GB | 866678 | 4/1961 |
| GB | 972589 A | 10/1964 |
| GB | 1376563 | 12/1974 |
| GB | 2382386 | 5/2003 |
| GB | 2459959 A | 11/2009 |
| JP | S48021050 A | 3/1973 |
| JP | S5649415 A | 5/1981 |
| JP | S59166711 A | 9/1984 |
| JP | S63076908 A | 4/1988 |
| JP | 3048013 A | 3/1991 |
| JP | 4285317 A | 10/1992 |
| JP | 5052222 A | 3/1993 |
| JP | 5052223 A | 3/1993 |
| JP | H0598463 A | 4/1993 |
| JP | 5126147 A | 5/1993 |
| JP | H05179277 A | 7/1993 |
| JP | H0790533 A | 4/1995 |
| JP | 9060397 A | 3/1997 |
| JP | H11115773 A | 4/1999 |
| JP | 2000120663 A | 4/2000 |
| JP | 2000188856 A | 7/2000 |
| JP | 2002213453 A | 7/2001 |
| JP | 2001208082 A | 8/2001 |
| JP | 2003183684 A | 7/2003 |
| JP | 2004506148 A | 2/2004 |
| JP | 2004513309 A | 4/2004 |
| JP | 2004277565 A | 10/2004 |
| JP | 2004360855 A | 12/2004 |
| JP | 2007502370 A | 2/2007 |
| JP | 2007186149 A | 7/2007 |
| JP | 2007239838 A | 9/2007 |
| JP | 2008038990 A | 2/2008 |
| JP | 2008069923 A | 3/2008 |
| JP | 2008069924 A | 3/2008 |
| JP | 2008069925 A | 3/2008 |
| JP | 2008095178 A | 4/2008 |
| JP | 2008156690 A | 7/2008 |
| JP | 2008184621 A | 8/2008 |
| JP | 2008531430 A | 8/2008 |
| JP | 2008281017 A | 11/2008 |
| RU | 2219416 C1 | 12/2003 |
| RU | 2329415 C2 | 7/2008 |
| SU | 1646706 A2 | 5/1991 |
| TW | 343260 B | 10/1998 |
| WO | 2001041136 A1 | 6/2001 |
| WO | 2001059314 A1 | 8/2001 |
| WO | 2002012740 A1 | 2/2002 |
| WO | 2003025907 A1 | 3/2003 |
| WO | 2004094852 A1 | 11/2004 |
| WO | 2004104268 A2 | 12/2004 |
| WO | 2006056731 A1 | 6/2006 |
| WO | 2011023794 A1 | 3/2011 |
| WO | 2011036126 A1 | 3/2011 |

OTHER PUBLICATIONS

Beer et al., "Section 2.6, Elastic Versus Plastic Behavior of Material," Mechanics of Materials, 1981, pp. 39-41, McGraw Hill.
A.R. Slayne, "Performance Characteristics of Actuator/Bearing Joints Made With Tolerance Rings", Magnetic Recording Conference, 2002, pp. WE-P-14-01 to WE-P-14-02, Digest of Asia-Pacific.
International Search Report and Written Opinion for PCT/GB2004/001681, dated Sep. 13, 2004, 9 pages.
European Search Report for European Patent Application No. 07252993.6, dated Dec. 19, 2007, 7 pages.
European Search Report for European Patent Application No. 09013623.5, dated Jan. 14, 2010, 5 pages.
International Search Report and Written Opinion for PCT/EP2010/063828, dated Dec. 21, 2010, 10 pages.
International Search Report and Written Opinion for PCT/EP2010/062544, dated Dec. 28, 2010, 12 pages.
International Search Report and Written Opinion for PCT/US2012/030143, dated Oct. 31, 2012, 7 pages.
Plastic Deformation; <http://www.matter.org.uk/schools/content/hookeslaw/plastic.html>, Materials Teaching Educational Resources, Matter Project, University of Liverpool; 1 page (1999).
Andrew Slayne, Declaration Under 37 C.F.R. 1.132 submitted to the United States Patent and Trademark Office (USPTO) for U.S. Appl. No. 12/033,241, signed Oct. 25, 2010, 4 pages.
International Search Report and Written Opinion for PCT/GB2005/004067, dated Jan. 26, 2006, 8 pages.
Extended European Search Report for EP16167392.6, dated Oct. 12, 2016, 7 pages.
"Coefficient of Friction Equation and Table Chart" Engineers Edge; https://www.engineersedge.com/coeffients_of_friction.htm; Dec. 15, 2014 (Year: 2014).

\* cited by examiner

ANNULAR MEMBER, METHOD, AND ASSEMBLY FOR COMPONENT DISPLACEMENT CONTROL

CROSS-REFERENCE TO RELATED APPLICATION(S)

This application claims priority under 35 U.S.C. § 119(e) to U.S. Patent Application No. 62/599,342 entitled "ANNULAR MEMBER, METHOD, AND ASSEMBLY FOR COMPONENT DISPLACEMENT CONTROL," by Thomas CHILDS, filed Dec. 15, 2017, which is assigned to the current assignee hereof and incorporated herein by reference in its entirety.

FIELD OF THE DISCLOSURE

The invention generally relates to annular members that are located between assemblies involving moving parts and, in particular, to an improved method and assembly using a stator and a housing.

BACKGROUND

Commonly, an interposed member may be used to constrain or restrict movement between assemblies involving stationary components including, such as stators and housings. One type of interposed member may be located in a gap between the outer surface of the stator and the inner surface of the bore of the housing. Such an assembly may further include rotary components, such as rotary components including rotating shafts or rotors adapted to rotate within the assembly within the stator and housing. Interposed members may also be used in assemblies such as generator assemblies, alternator assemblies, motor assemblies (including electric motor assemblies), engine assemblies, clutch assemblies, or holding mechanisms. Such assemblies may be used in automotive applications.

There is a desire for interposed members for assemblies that allow for position control of the components when forces are applied. However, position control can include to a variety of issues including, tight tolerances, complex parts or assembly procedures, unwanted component vibration or noise, and stiffness variation. Improvements in interposed members and assemblies incorporating them continue to be of interest.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

The use of the same reference symbols in different drawings indicates similar or identical items.

DETAILED DESCRIPTION OF THE INVENTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the motor/alternator/engine assembly and component arts.

Figure 1:
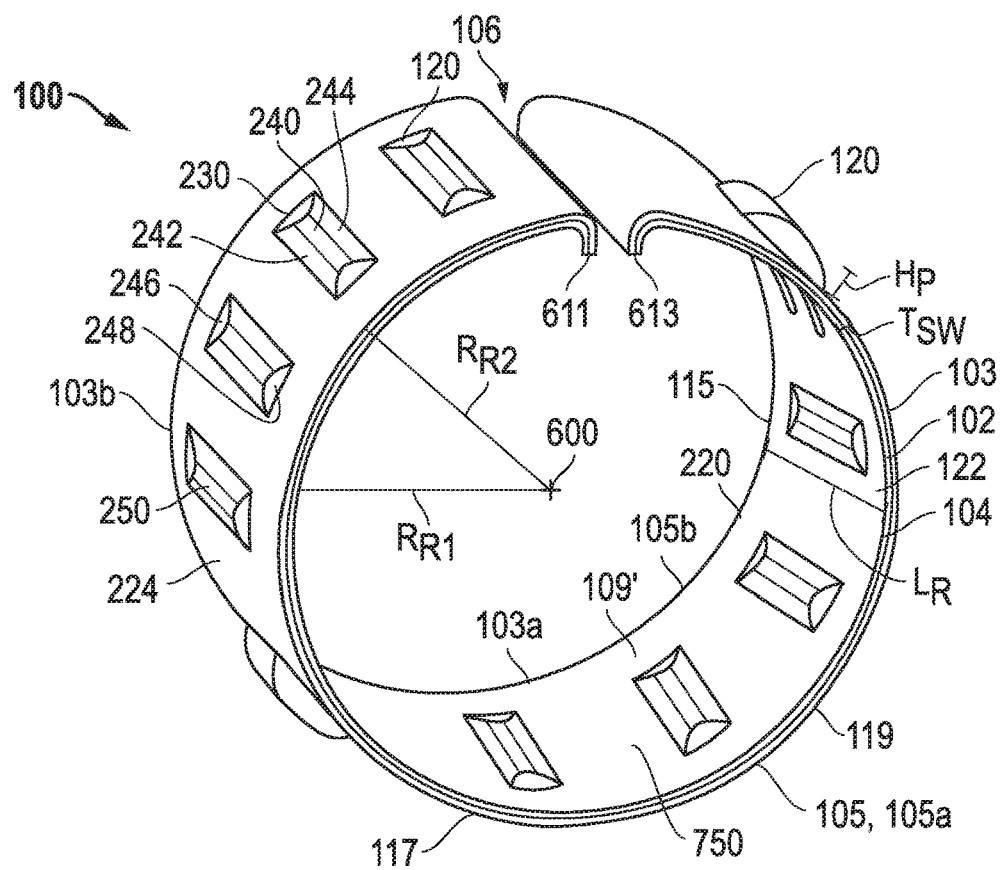
FIG. 1 is a perspective end view of one embodiment of an annular member constructed in accordance with the invention.
Figure 2:
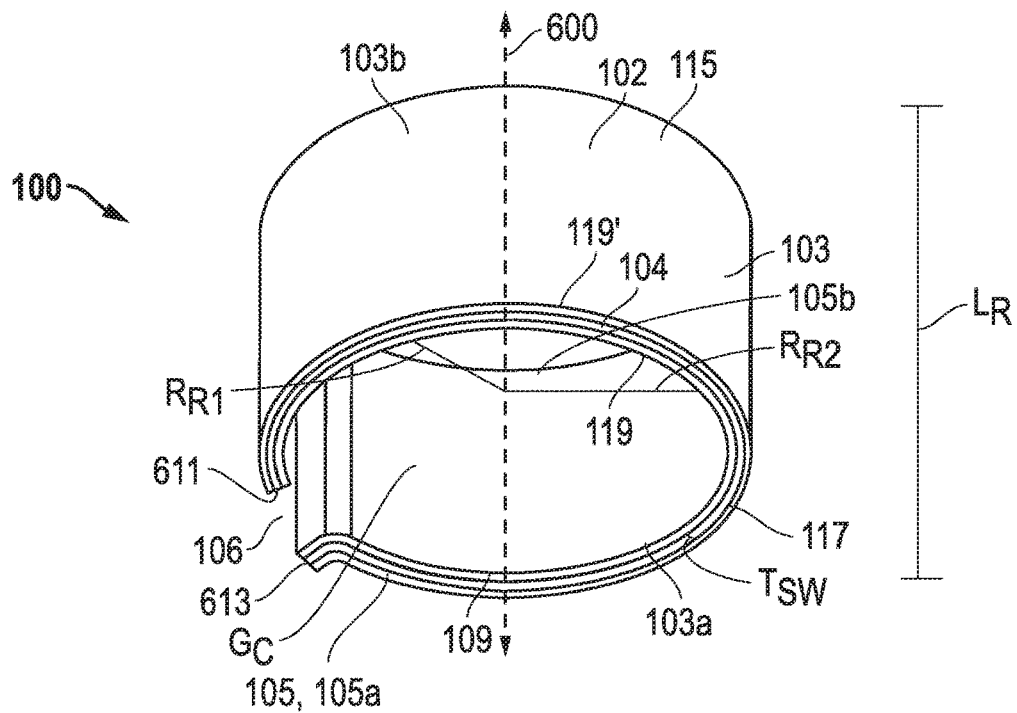
FIG. 2 is a perspective side view of one embodiment of an annular member constructed in accordance with the invention.
Figure 3:
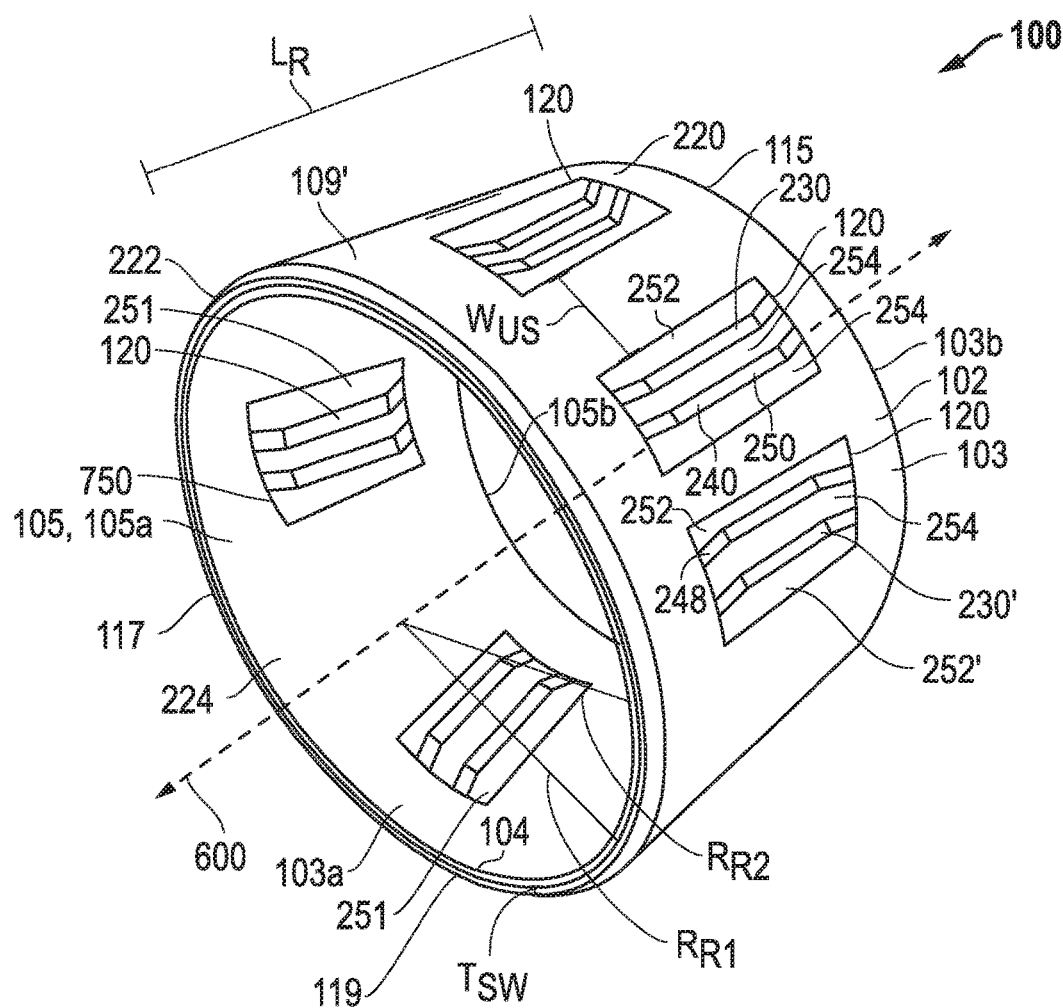
FIG. 3 is a perspective end view of one embodiment of an annular member constructed in accordance with the invention.
Figure 4:
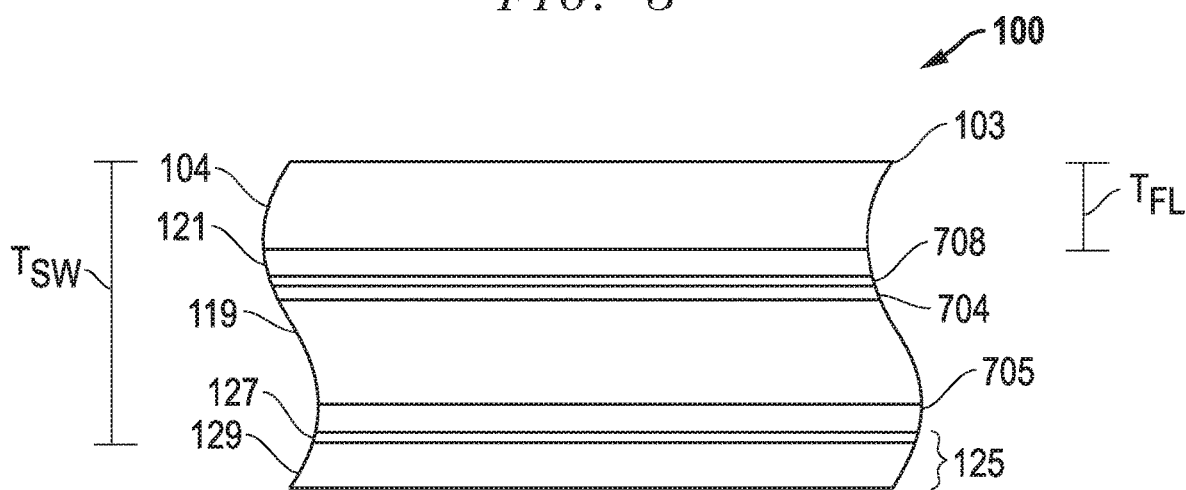
FIG. 4 is a schematic sectional side view of another embodiment of an annular member having layers and is constructed in accordance with the invention.

FIGS. 1-3 depict an annular member 100 according to a number of embodiments. The annular member 100 comprises a band 102 of material that may be curved into an annular member-like (substantially annular) shape about a central axis 600. The annular member 100 may have a first axial end 115 and a second axial end 117. The band 102 may include a sidewall 103. In an embodiment, the band 102 may include an interior sidewall 103a and an exterior sidewall 103b. The sidewall 103 may have an axial edge 105. In a number of embodiments, the sidewall 103 may have a first axial edge 105a and a second axial edge 105b. In a number of embodiments, the annular member 100 or band 102 may have a flat, circumferentially-extending unformed section 220 of resilient material along at least one axial end 115, 117 of the sidewall 103. In a number of embodiments, an upper unformed band 220 and a lower unformed band 222 of material may exist at each axial end 105, 107 of the sidewall 103 of the annular member 100. Unformed sections 224 can extend axially along the length of the sidewall 103 between, and extending from, the unformed bands 220, 222. In an embodiment, the annular member 100 and or band 102 may include a first circumferential end 611 and a second circumferential end 613. In a number of embodiments, as shown in FIGS. 1-2, the first circumferential end 611 and the second circumferential end 613 of the band 102 do not meet (e.g., it may be formed as a split annular member design), thereby leaving an axial gap 106 adjacent the circumference of the band 102. In a number of embodiments, the annular member 100 may include at least one axial gap 160 extending along the axial length of the annular member 100. In a number of embodiments, the annular member 100 or band 102 may have a plurality of axial gaps 106 around its circumference. In a number of embodiments, the plurality of axial gaps may thereby divide the annular member 100 into a plurality of annular member segments. In other embodiments, the band may be curved so that the ends overlap with one another. In yet further embodiments, as shown in FIG. 2, the band may be a continuous, unbroken annular member. In an embodiment, the interior sidewall 103a may include an inner surface. In an embodiment, the exterior sidewall 103b may include an outer surface.

In a number of embodiments, the annular member 100 can comprise a material with sufficient rigidity to withstand axial and longitudinal forces. In another embodiment, the annular member 100 can comprise a metal or alloy (such as, but not limited to, aluminum, zinc, copper, magnesium, tin, platinum, titanium, tungsten, iron, bronze, steel, annular member steel, stainless steel) formed through a machining process. The annular member 100 can be formed from a single piece, two pieces, or several pieces joined together by welding, adhesive, fasteners, threading, or any other suitable fastening means.

In an embodiment, as shown in FIG. 5, the annular member 100 can include a composite material. The annular member 100 may include at least one substrate layer 119 and at least one damping layer 104. The term "damping" herein may be understood to include both mechanisms of damping and/or vibration isolation. In an embodiment, the damping layer 104 may overlie and/or underlie the substrate layer 119. In an embodiment, the substrate layer 119 may overlie and/or underlie the damping layer 104. In an embodiment, the inner surface of the interior sidewall 103a may have a damping layer 104a that conforms to the shape of the band 102. In an embodiment, the outer surface of the exterior sidewall 103b may have a damping layer 104b that conforms to the shape of the band 102. The damping layer 104 can be coupled to at least a portion of the substrate layer 119, most notably the portion of the substrate along a projection 120. In a further embodiment, the damping layer 104 can be coupled to an entire major surface of the sidewall 103 e.g., the radially inner 103a or radially outer surface 103b of the sidewall 103. In a particular embodiment, the damping layer 104 can be coupled to the radially inner surface of the substrate layer 119 so as to form a low friction interface with another surface of another component. In a number of embodiments, a second substrate layer 119' may overlie the damping layer 104. In a number of embodiments, a plurality of substrate layers 119 and plurality of damping layers 104 may overlie or underlie one another in any configuration. In a number of embodiments, the annular band 102 and or a plurality of projections 120 may include a plurality of substrate layers 119 and plurality of damping layers 104 may overlie or underlie one another in any configuration. In a number of embodiments, a plurality of substrate layers 119 and plurality of damping layers 104 may include the annular band 102 and or a plurality of projections 120.

In an embodiment, the substrate layer 119 can at least partially include a metal. The metal may include aluminum, zinc, copper, magnesium, tin, platinum, titanium, tungsten, iron, bronze, alloys thereof, or may be another type. More particularly, the substrate can at least partially include a steel, such as a stainless steel. For example, the substrate can at least partially include a 301 stainless steel. The 301 stainless steel may be annealed, ¼ Hard, ½ hard, ¾ hard, or full hard. The substrate layer 119 may include a woven mesh or an expanded metal grid. Alternatively, the woven mesh can be a woven polymer mesh. In an alternate embodiment, the substrate layer 119 may not include a mesh or grid. (ADD Hard/Rigid polymer materials as substrate layer embodiment\nts) Optionally, the annular member 100 may include at least one adhesive layer 121 that may include any known adhesive material common to the annular member arts including, but not limited to, fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. In another alternate embodiment, the substrate layer 119, as a solid component, woven mesh or expanded metal grid, may be embedded between at least one adhesive layer 121 included between the friction material 104 and the substrate layer 119.

Optionally, the substrate layer 119 may be coated with corrosion protection layers 704 and 705 to prevent corrosion of the annular member substrate prior to processing. Additionally, a chemical conversion layer 708 can be applied over layer 704. Each of layers 704, 705, and 708 can have a thickness of about 1 to 50 microns, such as about 7 to 15 microns. Layers 704 and 705 can include a phosphate of zinc, iron, manganese, or any combination thereof, or a nano-ceramic layer. Further, layers 704 and 705 can include functional silanes, nano-scaled silane based primers, hydrolyzed silanes, organosilane adhesion promoters, solvent/water based silane primers, chlorinated polyolefins, passivated surfaces, aluminum, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Corrosion protection layers 704, 705, and 708 can be removed or retained during processing.

Optionally, the annular member 100 may further include a corrosion resistant coating 125. The corrosion resistant coating 125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 127 can include a phosphate of zinc, iron, manganese, tin, or any combination thereof, or a nano-ceramic layer. The chemical conversion layer 127 can include functional silanes, nano-scaled silane based layers, hydrolyzed silanes, organosilane adhesion promoters, solvent/water based silane primers, chlorinated polyolefins, passivated surfaces, or any combination thereof. The epoxy layer 129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the damping layer 104 may include a material used for damping and/or vibration isolation. In a number of embodiments, the damping layer 104 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, a foam material, or any combination thereof. In an example, the damping layer 104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the damping layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the damping layer 10 includes polyketone, such as polyether ether ketone (PEEK), polyether ketone, polyether ketone ketone, polyether ketone ether ketone, a derivative thereof, or a combination thereof. In an additional example, the damping layer may be an ultra high molecular weight polyethylene. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), natural polyisoprene, synthetic polyisoprene, polybutadiene, chloroprene rubber, butyl rubber, styrene-butadiene rubber, nitrile rubber, ethylene propylene, rubber, ephichlorohydrin rubber, polyacrylic rubber, silicone rubber, fluorosilicone rubber, fluoroelastomers, perfluoroelastomers, polyether block amides, chlorosulfonated polyethylene, ethyl-vinyl acetate (EVA), EVA foam, low-density polyethylene foam, nitrile rubber foam, polychloroprene foam, polyimide foam, polypropylene foam, polyurethane foam, polystyrene foam, polyvinyl chloride foam, silicone foam, foam rubber, polyurethane foam, XPS foam, epoxy foam, phenolic foam, or any combination thereof. The damping layer 104 may include a foam material including any of the materials listed above. The damping layer 104 may include an elastomeric material including any of the materials listed above. The damping layer 104 may include rubber including any of the materials listed above. The damping layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. The damping layer 104 may further include fillers, including glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Ekonol), and mineral particles such as wollastonite and barium sulfate, or any combination thereof. Fillers can be in the form of beads, fibers, powder, mesh, or any combination thereof.

In some embodiments, the annular member 100 may be formed from a flat strip of resilient material (which forms the band 102). Before the strip is bent into its curved shape, the damping layer 104 may be laminated onto one surface thereof. In other embodiments, the damping layer 104 may be laminated onto both surfaces of the flat strip 102. After the damping layer 104 may be attached to the flat strip, the resulting layer structure may be stamped (e.g., pressed using a suitably shaped mold, rotary wave forming, etc.) to form projections 120. Thus, at least one of the projections 120 may be formed from both the strip of resilient material and from the damping layer 104. The material of the damping layer 104 may be chosen to be flexible to facilitate this stamping step. The friction layer 104 may be on the radial outside or the radial inside of the band at the interior sidewall 103a or the exterior sidewall 103b. After the projections 120 may be formed, the layered structure may be curved into the annular member-like configuration shown in FIGS. 1 and 3. The annular member 100 may be a constrained layer or projection design as shown in FIG. 1. The annular member 100 may be a foam or rubber sleeve design as shown in FIG. 2. The annular member 100 may be a slotted projection design as shown in FIG. 3. In the embodiment shown, the band 102 may be the outer material. In other embodiments, the band 102 may be the inner material.

In an embodiment, the sidewall 103 can have a thickness $T_{SW}$ in a range of 0.2 mm and 25 mm, such as a range of 0.2 mm and 1 mm, a range of 0.25 mm and 1 mm, or a range of 0.3 mm and 1 mm.

In an embodiment, the damping layer can have a thickness $T_{FL}$ in a range of 0.1 mm and 0.4 mm, such as in a range of 0.15 mm and 0.35 mm, or even in a range of 0.2 mm and 0.3 mm. In this embodiment, the substrate layer 119 can form all, or nearly all, of the remaining thickness of the sidewall 103. In an embodiment, the thickness of the sidewall 103 may be uniform, i.e., a thickness at a first location of the sidewall 103 can be equal to a thickness at a second location therealong.

In some embodiments, the annular member 100 may be formed from steel (e.g., cold rolled stainless steel) and may have a damping layer 104 laminated thereto. For example, the stainless steel may be 0.1 to 0.7 mm thick, and the low friction may be in a range of about 0.05 to 0.50 mm thick (e.g., 0.25 mm) and bonded to the steel before the annular member 100 may be formed into its circular shape.

In an embodiment, referring to FIGS. 1-4, the annular member 100 may have an inner radius $R_{R1}$ of at least 5 mm, at least 10 mm, or at least 20 mm. The inner radius $R_{R1}$ may be no greater than 500 mm, no greater than 350 mm, no greater than 250 mm, or no greater than 200 mm. The annular member 100 may have an outer radius $R_{R2}$ of least 5 mm, at least 10 mm, or at least 20 mm. The outer radius $R_{R2}$ may be no greater than 500 mm, no greater than 350 mm, no greater than 250 mm, or no greater than 200 mm.

In an embodiment, the annular member 100 can have an axial length, $L_R$, as measured between axial ends 115, 117, of no greater than 500 mm, no greater than 250 mm, no greater than 150 mm, or no greater than 100 mm. The annular member 100 can have an axial length, $L_R$, as measured between axial ends 115, 117, of at least 5 mm, at least 10 mm, or at least 25 mm. The inner radius $R_{R1}$ may vary along the axial length $L_R$. The outer radius $R_{R2}$ may vary along the axial length $L_R$.

Referring to FIGS. 1 and 3, in a number of embodiments, at least one projection 120 may be at least partially coupled to the annular member 100. In an embodiment, the projection 120 may be formed in the annular member 100. The projection 120 can be monolithic with the sidewall 103, i.e., the projection 120 may have a unitary construction with the sidewall 103. In another particular embodiment, at least one of the projections 120 may comprise a separate component attached to the sidewall 103. For example, the separate component may be attached to the sidewall 103 by an adhesive, welding, crimping, or any other suitable process recognizable in the art. In an embodiment, the projection 120 may be located axially inward of an axial edge 115, 117 of the sidewall 103 of the annular member 103. In an embodiment, at least one projection 120 can extend radially outward from the sidewall 103. In an embodiment, at least one projection 120 can extend radially inward from the sidewall 103. In an embodiment, as shown in FIGS. 1-3, at least one projection 120 can be oriented circumferentially down the sidewall 103 of the annular member. In an alternative embodiment, at least one projection 120 can be oriented axially down the sidewall 103 of the annular member. The projection 120 may be radially extending. In an embodiment, the projections 120 may be radially extending away from the central axis 600. In an embodiment, the projections 120 may be self-contained, discrete structures and may retain any grease applied before assembly and reduce or minimize subsequent leakage.

As depicted, the annular member 100 can include one row, or band, of projections 120. In other aspects, the annular member 100 can include two rows, or bands, of projections 120; three rows, or bands, of projections 120; etc. In a number of embodiments, the annular member can include 1 to 5 bands of projections 120. Further, a total number of projections 120, $N_{WS}$, in each row can be ≥3, such as ≥4, ≥5, ≥6, ≥7, ≥8, or ≥9. Further, $N_{WS}$≤30, ≤25, ≤20, or ≤15. In a number of embodiments, the total number of projections 120 may be between 3 and 360 projections 120, such as 20 and 200 projections 120. $N_{WS}$ can be within a range between and including any of the $N_{WS}$ values above.

In an embodiment, the plurality of projections 120 can be disposed in at least two circumferentially extending rows. In a particular embodiment, the plurality of projections 120 may be disposed in at least 3 circumferentially extending rows, such as at least 4 circumferentially extending rows, at least 5 circumferentially extending rows, or even at least 6 circumferentially extending rows. In another embodiment, the plurality of projections 120 can be disposed in no greater than 25 circumferentially extending rows, such as no greater than 15 circumferentially extending rows, no greater than 10 circumferentially extending rows, or even no greater than 7 circumferentially extending rows.

In an embodiment, the projections 120 can each define an axial bisecting line. In an embodiment, the axial bisecting lines of at least two projections 120 can be oriented parallel, i.e., the at least two projections 120 may be oriented parallel to each other. In a more particular embodiment, all of the projections 120 can be oriented parallel with respect to each other.

In an embodiment, at least two projections 120 can extend from the sidewall 103 in different directions. In a more particular embodiment, at least two projections 120 can extend in opposite radial directions from the interior sidewall 103a and the exterior sidewall 103b. In a more particular embodiment, at least two projections 120 can extend in opposite axial directions. In an embodiment, at least two projections 120 may extend away from each other, i.e., the connected sides 707 of at least two projections 120 may be closer together than any other portion of the projections 120.

Each projection 120 can define an aspect ratio as measured by a length thereof as compared to a width thereof. The projection 120 length may be defined as the larger dimension between length and width of the projection 120 in the axial or circumferential direction. The projection width may be defined as the smaller dimension of length and width of the projection 120 in the axial or circumferential direction. In an embodiment, at least one of the projections 120 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

The projection 120 may be formed by a process, such as, for example, stamping, pressing, punching, or cutting. In an embodiment, at least one of the projections 120 may be formed prior to formation of the sidewall 103, e.g., prior to rolling a flat sheet to form the sidewall 103. In an embodiment, at least one of the projections 120 may be formed after formation of the sidewall 103, e.g., after rolling a flat sheet to form the sidewall 103.

In an embodiment, at least two of the projections 120 have the same geometric shape or size as compared to each other. In a further embodiment, all of the projections 120 may have the same geometric shape or size as compared to each other. In another embodiment, at least two of the projections 120 may have different geometric shapes or sizes as compared to each other. In a further embodiment, all of the projections 120 may have different geometric shapes or sizes as compared to each other.

The projections 120 may be carefully selected and designed for their force transfer or spring member properties. The geometry of the projections 120 may be selected to provide desired elastic/plastic deformation characteristics. For example, at least one of the projections 120 may be altered in geometry from another projection 120 to alter the rotational or axial movement of the projections 120. The deformation characteristics may be selected not only to take account of the manufacturing member tolerances of the inner and outer components 302, 306, but also to compensate for differential thermal expansion and wear that may occur between dissimilar components in operation, thus ensuring member the desired performance may be achieved throughout. These designs may be applicable to zero clearance annular members 100 to ensure that the assembled components 302, 306 do not become loose at elevated temperatures.

As shown in FIG. 1, the projections 120 may be polygonal in cross-section. In a number of embodiments, the projections 120 may have a polygonal, circular, or semicircular cross-section. In a number of embodiments, the projections 120 may include at least one shouldered or shoulderless wave structure 230. In a number of embodiments, each wave structure 230 can include a wave body 240, a first wave side 242 on a first side of the wave body 240 and a second wave side 244 on a side second side of the wave body opposite first wave side 242. Each wave body 240 can include a generally arch shaped structure forming a plateau section 250 that extends between the upper unformed band 220 and the lower unformed band 222. Each wave body 240 can include a generally arch shaped structure that extends between the upper unformed band 220 and the lower unformed band 102. The wave structures 230 may have a first shoulder 246 and a second shoulder 248. The wave structures may be oriented as shown in FIG. 1, where the first shoulder 246 and second shoulder 248 extend in the axial direction, or may be oriented where the first shoulder 246 and second shoulder 248 extend in the radial direction. As shown in FIG. 3, at least one wave structure 230 can include a wave body 240 and at least one aperture 251 or a plurality of apertures 251. In a number of embodiments, the apertures 251. The annular member 100 may be a slotted sideless design as shown in FIG. 3 with a plurality of projections 120 acting as bridges between the apertures 251. In a number of embodiments, the aperture 251 may have zero width while the projections 120 (or bridges) hold the entirety of the width of the annular member 100.

In a number of embodiments, the wave body 240 can include a first wave cutout 252 on a first side of the wave body 240 and a second wave cutout 254 on a second side of the wave body opposite first wave cutout 252. In a number of embodiments, wave structures 230, 230' may share a cutout 254. In a number of embodiments, the cutouts 252, 254 may cut into or replace at least a portion of the first wave side 242 and/or the second wave side 244.

Figure 7:
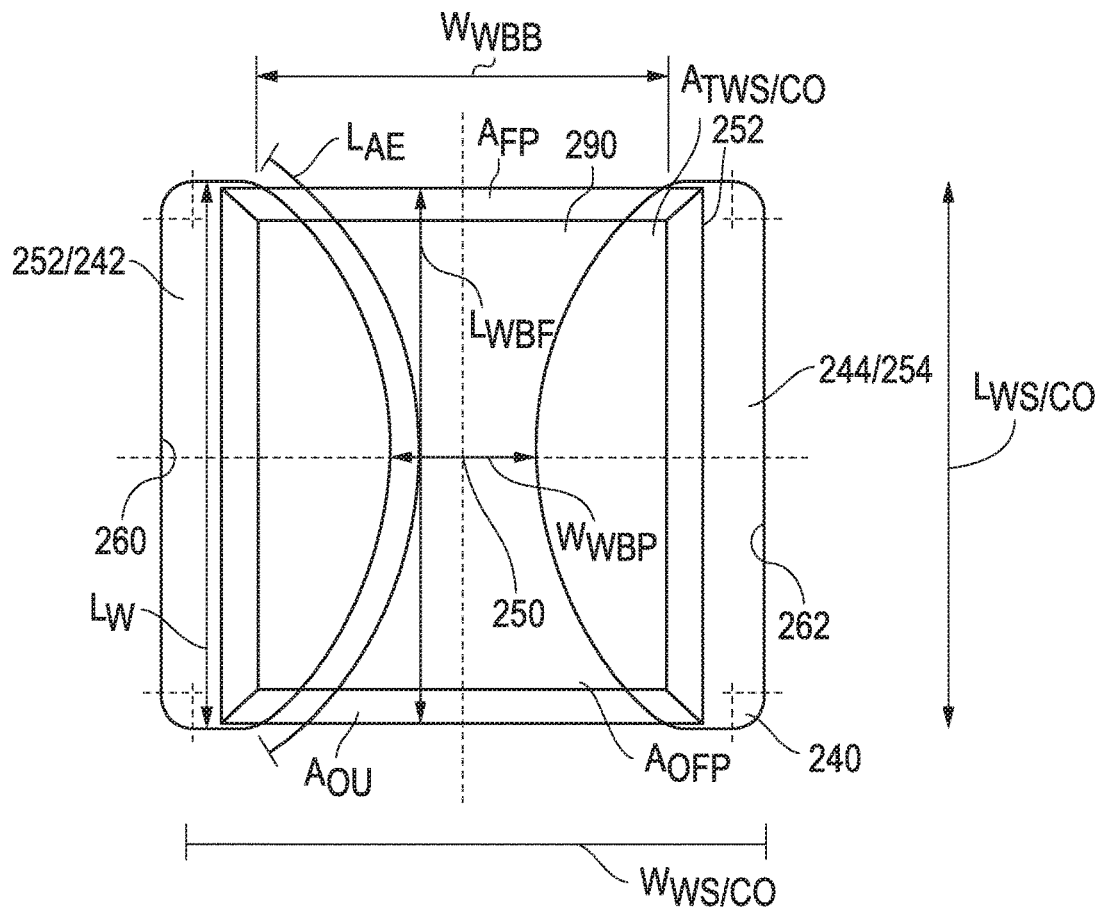
FIG. 7 is a plan view of an embodiment of a projection for an annular member constructed in accordance with the invention.

As best depicted in FIG. 7, each wave body 240 can include a generally rectangular footprint 252 that represents the outer perimeter, or shape, of the wave body 240 prior to the formation of the wave sides 242, 244 or wave cutouts 252, 254 depending on the embodiment. The footprint 252 may be surrounded by the unformed bands 220, 222 and adjacent unformed sections 224. The plateau section 250 may define the radial edge of the footprint 252. The footprint 252 can have a footprint length, $L_{WBF}$, and a footprint width, $W_{WBF}$. The projection 120 or plateau section 250 may have a height $H_P$, measured from the sidewall 103 to the peak of projection 120 or plateau section 250. Each wave side 242, 244 or wave cutout 252, 254 can include a length, $L_{WS/CO}$. L $L_{WS/CO}$ can be $\geq L_{WBF}$, such as $\geq 101\%$ $L_{WBF}$, $\geq 102\%$ $L_{WBF}$, $\geq 103\%$ $L_{WBF}$, $\geq 104\%$ $L_{WBF}$, or $\geq 105\%$ $L_{WBF}$. L $L_{WS/CO}$ can also be $\leq 125\%$ $L_{WBF}$, such as $\leq 120\%$ $L_{WBF}$, $\leq 115\%$ $L_{WBF}$, or $\leq 110\%$ $L_{WBF}$. Further, L $L_{WS/CO}$ can be within a range between and including any of the % $L_{WBF}$ values.

The wave sides 242, 244 or wave cutouts 252, 254 can include an overall width, $W_{WS/CO}$, measured between an outermost vertical edge 260 of the first wave side 242 or wave cutout 252 and an outermost vertical edge 262 of the second wave side 244 or wave cutout 254. $W_{WS/CO}$ can be $\geq W_{WBF}$, such as $\geq 101\%$ $W_{WBF}$, $\geq 102\%$ $W_{WBF}$, $\geq 103\%$ $W_{WBF}$, $\geq 104\%$ $W_{WBF}$, or $\geq 105\%$ $W_{WBF}$. Moreover, wherein $W_{WS/CO}$ is $\leq 150\%$ $W_{WBF}$, such as $\leq 145\%$ $W_{WBF}$, $\leq 140\%$ $W_{WBF}$, $\leq 135\%$ $W_{WBF}$, $\leq 130\%$ $W_{WBF}$, or $\leq 125\%$ $W_{WBF}$. Further, $W_{WS/CO}$ can be within a range between and including any of the % $W_{WBF}$ values.

In a particular aspect, as illustrated in FIG. 7, each wave body 240 comprises a base width, $W_{WBB}$, measured at an interface of each wave body 240 and the upper unformed band 220 or the lower unformed band 222, and a peak width, $W_{WBP}$, measured at a peak of each wave body 240. $W_{WBP}$ can be $\leq W_{WBB}$, such as $\leq 75\%$ $W_{WBB}$, $\leq 70\%$ $W_{WBB}$, $\leq 65\%$ $W_{WBB}$, $\leq 60\%$ $W_{WBB}$, $\leq 55\%$ $W_{WBB}$, or $\leq 50\%$ $W_{WBB}$. In another aspect, $W_{WBP}$ can be $\geq 25\%$ $W_{WWB}$, such as $\geq 30\%$ $W_{WBB}$, $\geq 35\%$ $W_{WBB}$, or $\geq 40\%$ $W_{WBB}$. Moreover, $W_{WBP}$ can be within a range between and including any of the 5% $W_{WBB}$ values.

The footprint 250 of the wave body 240 can include an area, $A_{FP}$, that is equal to, $H_{WBF} \times W_{WBF}$. The wave sides 242, 244 or wave cutout 252, 254 together can include a total cutout area, $A_{WS/CO}$, that is equal to the surface area of the material removed or altered in height from the unformed section 224 and the wave body 240 at each wave structure 230. $A_{WS/CO}$ can be $\leq A_{FP}$, such as $\leq 80\%$ $A_{FP}$, $\leq 75\%$ $A_{FP}$, $\leq 70\%$ $A_{FP}$, $\leq 65\%$ $A_{FP}$, or $\leq 60\%$ $A_{FP}$. In another aspect, $A_{WS/CO}$ can be $\geq 25\%$ $A_{FP}$, $\geq 30\%$ $A_{FP}$, $\geq 35\%$ $A_{FP}$, $\geq 40\%$ $A_{FP}$, $\geq 45\%$ $A_{FP}$, or $\geq 50\%$ $A_{FP}$. Further, $A_{WS/CO}$ can be within a range between and including any of the % $A_{FP}$ values.

In another aspect, $A_{WS/CO}$ comprises an area that overlaps the wave body footprint, $A_{OFP}$, and an area that overlaps one or more unformed sections, the upper unformed band, the lower unformed band, or a combination thereof, $A_{OU}$. $A_{OU}$ can be $\leq A_{OFP}$, such as $\leq 45\%$ $A_{OFP}$, $\leq 40\%$ $A_{OFP}$, $\leq 35\%$ $A_{OFP}$, $\leq 30\%$ $A_{OFP}$, or $\leq 25\%$ $A_{OFP}$. Moreover, $A_{OU}$ can be $\geq 1\%$ $A_{OFP}$, such as $\geq 2\%$ $A_{OFP}$, $\geq 3\%$ $A_{OFP}$, $\geq 4\%$ $A_{OFP}$, or $\geq 5\%$ $A_{OFP}$. $A_{OU}$ can be within a range between and including any of the % $A_{OFP}$ values.

In yet another aspect, $A_{OU}$ can be $\leq A_{WS/CO}$, such as $\leq 30\%$ $A_{WS/CO}$, $\leq 25\%$ $A_{WS/CO}$, $\leq 20\%$ $A_{WS/CO}$, or $\leq 15\%$ $A_{WS/CO}$. Also, $A_{OU}$ can be $\geq 1\%$ $A_{WS/CO}$, such as $\geq 2\%$ $A_{WS/CO}$, $\geq 3\%$ $A_{WS/CO}$, $\geq 4\%$ $A_{WS/CO}$, or $\geq 5\%$ $A_{WS/CO}$. $A_{OU}$ can be within a range between and including any of the % $A_{WS/CO}$ values.

In another aspect, $A_{OFP}$ can be $\geq 70\%$ $A_{WS/CO}$, such as $\geq 75\%$ $A_{WS/CO}$, $\geq 80\%$ $A_{WS/CO}$, or $\geq 85\%$ $A_{WS/CO}$. Further, $A_{OFP} \leq A_{WS/CO}$, such as $\leq 99\%$ $A_{WS/CO}$, $\leq 98\%$ $A_{WS/CO}$, $\leq 97\%$ $A_{WS/CO}$, $\leq 96\%$ $A_{WS/CO}$, or $\leq 95\%$ $A_{WS/CO}$. $A_{OFP}$ can be within a range between and including and of the $A_{WS/CO}$ values.

FIG. 7 indicates that each wave side 242, 244 or wave cutout 252, 254 can include an inner arcuate edge 270, 272 that is adjacent to the wave body 240 and forms a first side edge and a second side edge of the wave body 240. Each arcuate edge 270, 272 can include an arc length, $L_{AE}$, and $L_{AE}$ can be $\geq H_{WBF}$, such as $\geq 101\%$ $H_{WBF}$, $\geq 102\%$ $H_{WBF}$, $\geq 103\%$ $H_{WBF}$, $\geq 104\%$ $H_{WBF}$, or $\geq 105\%$ $H_{WBF}$. In another aspect, $L_{AE}$ can be $\leq 200\%$ $H_{WBF}$, such as $\leq 175\%$ $H_{WBF}$, $\leq 150\%$ $H_{WBF}$, $\leq 145\%$ $H_{WBF}$, $\leq 140\%$ $H_{WBF}$, $\leq 135\%$ $H_{WBF}$, $\leq 130\%$ $H_{WBF}$, or $\leq 125\%$ $H_{WBF}$. $L_{AE}$ can also be within a range between and including any of the % $H_{WBF}$ values.

In another aspect, each unformed section 224 can include a width, $W_{US}$, that is substantially the same as $W_{WBB}$. In this aspect, $W_{US}$ can be $\geq 60\%$ $W_{WBB}$, such as $\geq 65\%$ $W_{WBB}$, $\geq 70\%$ $W_{WBB}$, $\geq 75\%$ $W_{WBB}$, $\geq 80\%$ $W_{WBB}$, $\geq 85\%$ $W_{WBB}$, $\geq 90\%$ $W_{WBB}$, $\geq 95\%$ $W_{WBB}$, $\geq 96\%$ $W_{WBB}$, $\geq 97\%$ $W_{WBB}$, $\geq 98\%$ $W_{WBB}$, $\geq 99\%$ $W_{WBB}$, or $\geq 100\%$ $W_{WBB}$. Further, $W_{US}$ can be $\leq 125\%$ $W_{WBB}$, such as $\leq 120\%$ $W_{WBB}$, $\leq 115\%$ $W_{WBB}$, $\leq 110\%$ $W_{WBB}$, $\leq 105\%$ $W_{WBB}$, $\leq 104\%$ $W_{WBB}$, $\leq 103\%$ $W_{WBB}$, ≤102% $W_{WBB}$, or ≤101% $W_{WBB}$. $W_{US}$ can also be within a range between and including any of the % $W_{WBB}$ values.

In a particular aspect, the outer radius, $R_{R2}$, can be based on the height $H_P$ of the projection 120 or plateau section 250. $H_P$ can be ≤5% $R_{R2}$, such as ≤4% $R_{R2}$, ≤3% $R_{R2}$, ≤2% $R_{R2}$, or ≤1% $R_{R2}$. $H_P$ can be ≥0.1% $R_{R2}$, such as ≥0.2% $R_{R2}$, ≥0.3% $R_{R2}$, ≥0.4% $R_{R2}$, or ≥0.5% $R_{R2}$. Moreover, $H_P$ can be within a range between and including any of the % $R_{R2}$ values.

Figure 5A:
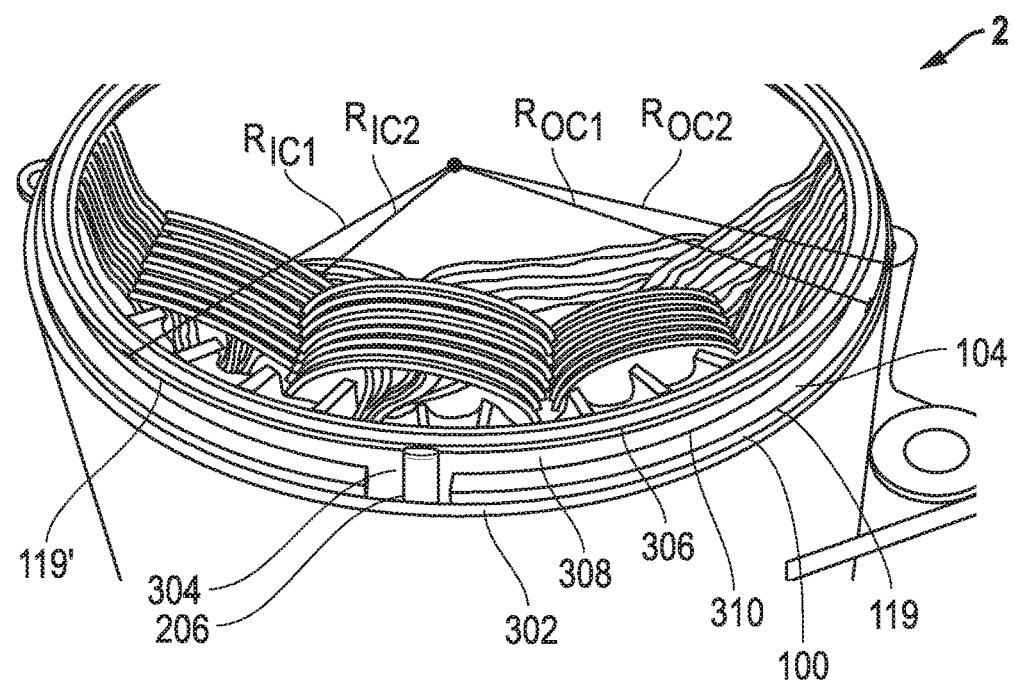
FIG. 5A is a perspective end view of an assembly constructed in accordance with the invention.
Figure 5B:
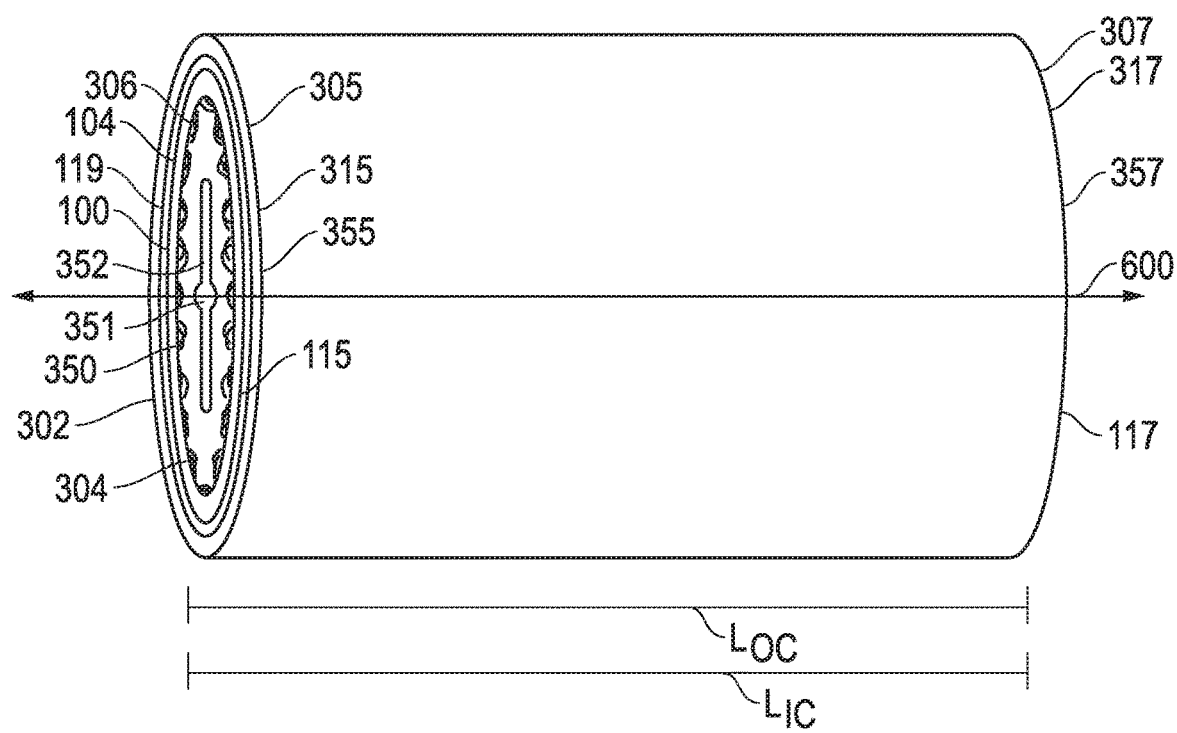
FIG. 5B is a perspective side view of an assembly constructed in accordance with the invention.

FIGS. 5A-5B depict an assembly 2 which incorporates, for example, the annular member 100 shown in FIGS. 1-3 according to a number of embodiments. The assembly 2 further includes an outer component 302, such as, but not limited to, a housing. The outer component 302 may have a first axial end 305 and a second axial end 307 along a central axis 600. The outer component 302 may have a bore 304 formed therein, which receives an inner component 306, such as but not limited to, a stator. The bore 304 may be provided in at least one of the radial or axial direction relative to the central axis 600. The inner component 306 may have a first axial end 315 and a second axial end 317. Annular members 100 may be used to provide a fit between the outer component 302 and the inner component 306. When the annular member 100 is mounted on the inner or outer component 302, 306 in an assembly 2, the projections 120 may act as guides to aid axial installation of the other component 302, 306. In a number of embodiments, the projections 120 of the annular member 100 may face radially outward in the assembly 2 towards the housing or outer member 302. In a number of embodiments, the projections 120 of the annular member 100 may face radially inward in the assembly 2 towards the stator or inner member 306. The assembly 2 also may include a rotor 350. The rotor 350 may have a first axial end 355 and a second axial end 357 along a central axis 600. The rotor 350 may include a shaft 351 and a plurality of blades 352. The rotor 350, may be adapted to rotate or otherwise move within the bore 304 of the assembly 2 to produce a torque around the rotor's axis and may produce electricity in assemblies. The assembly may include any assembly including a rotor and stator, such as generator assemblies (including, but not limited to, alternator assemblies), motor assemblies (including, but not limited to, electric motor assemblies), engine assemblies, clutch assemblies, or holding mechanisms.

In a number of embodiments, an annular gap 206 may exist between an outer surface 308 of inner component 306 and an inner surface 310 of bore 304. The size of this annular gap 206 may be variable because the diameter of the inner component 306 and bore 304 may vary within annular member dimensions listed above. In a number of embodiments, the annular member 100 may have an inner radius $R_{R1}$ and an outer radius $R_{R2}$ tailored to be radially compressed between the inner component 306 and the outer component 302 to exert a radial force outward onto the outer component 302 and inward onto the inner component 306 to maintain a positional relationship therebetween. In a number of embodiments, the annular member 100 may not be fixed to at least one of the inner component 306 or the outer component 302. In a number of embodiments, the annular member 100 may be fixed to at least one of the inner component 306 or the outer component 302 through form fitting, force fitting, or bonding (including, but not limited to, adhesive bonding). The adhesive used may include any of the adhesives commonly known or shown in the adhesive layer 121 listed above. To prevent vibration of the inner component 306 within the bore 304, the annular gap 206 may be filled by annular member 100 to form a zero-clearance fit between the components. The annular member 100 may reduce the gap to zero so there may be no clearance between the components 302, 306 in assembly 2.

In an embodiment, the outer component 302 can include any material commonly used in the rotational, electric motor, electric generator, or alternator assembly arts. The outer component 302 can comprise any suitable material with sufficient rigidity to withstand axial and longitudinal forces. In a particular embodiment, the outer component 302 can comprise an injection molded polymer. In another embodiment, the outer component 302 can comprise a metal or alloy (such as, but not limited to, aluminum, zinc, copper, magnesium, tin, platinum, titanium, tungsten, iron, bronze, steel, spring member steel, stainless steel) formed through a machining process. In yet another embodiment, the outer component 302 can comprise a ceramic or any other suitable material. The outer component 302 can be formed from a single piece, two pieces, or several pieces joined together by welding, adhesive, fasteners, threading, or any other suitable fastening means.

In an embodiment, the outer component 302 may have an inner radius $R_{OC1}$ from the central axis 600 of at least 5 mm, at least 10 mm, at least 15 mm, at least 20 mm, at least 30 mm, at least 40 mm. The inner radius $R_{OC1}$ may be no greater than 5 mm, no greater than 10 mm, no greater than 15 mm, no greater than 20 mm, no greater than 30 mm, no greater than 40 mm. The outer component 302 may have an outer radius $R_{OC2}$ of at least 5 mm, at least 10 mm, at least 15 mm, at least 20 mm, at least 30 mm, at least 40 mm. The outer radius $R_{OC2}$ may be no greater than 5 mm, no greater than 10 mm, no greater than 15 mm, no greater than 20 mm, no greater than 30 mm, no greater than 40 mm.

In an embodiment, the outer component 302 can have an axial length, $L_{OC}$, as measured between axial ends 115, 117, of no greater than 5 mm, no greater than 10 mm, no greater than 15 mm, no greater than 20 mm, no greater than 30 mm, no greater than 40 mm. The outer component 302 can have an axial length, $L_{OC}$, as measured between axial ends 115, 117, of at least 5 mm, at least 10 mm, at least 15 mm, at least 20 mm, at least 30 mm, at least 40 mm. The inner radius $R_{OC1}$ may vary along the axial length $L_{OC}$. The outer radius $R_{OC2}$ may vary along the axial length $L_{OC}$.

In an embodiment, the inner component 306 can include any material commonly used in the rotational, electric motor, electric generator, or alternator assembly arts. The inner component 306 can comprise any suitable material with sufficient rigidity to withstand axial and longitudinal forces. In a particular embodiment, the inner component 306 can comprise an injection molded polymer. In another embodiment, the inner component 306 can comprise a metal or alloy (such as, but not limited to, aluminum, zinc, copper, magnesium, tin, platinum, titanium, tungsten, iron, bronze, steel, spring member steel, stainless steel) formed through a machining process. In yet another embodiment, the inner component 306 can comprise a ceramic or any other suitable material. The inner component 306 can be formed from a single piece, two pieces, or several pieces joined together by welding, adhesive, fasteners, threading, or any other suitable fastening means.

In an embodiment, the inner component 306 may have an inner radius $R_{IC2}$ from the central axis 600 of at least 5 mm, at least 10 mm, at least 15 mm, at least 20 mm, at least 30 mm, at least 40 mm. The inner radius $R_{IC2}$ may be no greater than 5 mm, no greater than 10 mm, no greater than 15 mm, no greater than 20 mm, no greater than 30 mm, no greater than 40 mm. The inner component 306 may have an outer radius $R_{IC1}$ of at least 5 mm, at least 10 mm, at least 15 mm, at least 20 mm, at least 30 mm, at least 40 mm. The outer radius $R_{IC1}$ may be no greater than 5 mm, no greater than 10 mm, no greater than 15 mm, no greater than 20 mm, no greater than 30 mm, no greater than 40 mm.

In an embodiment, the inner component 306 can have an axial length, $L_{IC}$, as measured between axial ends 115, 117, of no greater than 5 mm, no greater than 10 mm, no greater than 15 mm, no greater than 20 mm, no greater than 30 mm, no greater than 40 mm. The inner component 306 can have an axial length, $L_{IC}$, as measured between axial ends 115, 117, of at least 5 mm, at least 10 mm, at least 15 mm, at least 20 mm, at least 30 mm, at least 40 mm. The inner radius $R_{IC1}$ may vary along the axial length $L_{IC}$. The outer radius $R_{OC2}$ may vary along the axial length $L_{IC}$.

In use, the band 102 of the annular member 100 may deform elastically when disposed between the components 302, 306 in the assembly 2. The other of the components 302, 306 may be mounted on the assembly 2, thereby compressing the annular member in the gap 206 between the components 302, 306, preferably only the projections 120 deform. This deformation may be elastic or plastic, depending on the shape and/or profile of the projections 120 and the size of the gap 206.

The damping layer 104 may be attached to a surface of the band 102 facing the inner or outer component 302, 306. The damping layer 104 may be coated or bonded to the band 102. In one embodiment, the damping layer 104 may be laminated on the surface of the band 102. Laminating the damping layer 104 provides an even thickness around the band 102 to avoid thin patches that may occur if the layer is coated by immersing the band 102 in a liquid form of the second material and spinning or otherwise shaking off the excess.

In an embodiment, the assembly 2 may include a lubricant 399 on any of its components including the inner component 306, outer component 302, or annular member 100. The lubricant 399 may include a grease including at least one of lithium soap, lithium disulfide, graphite, mineral or vegetable oil, silicone grease, fluorether-based grease, apiezon, food-grade grease, petrochemical grease, or may be a different type. The lubricant 399 may include an oil including at least one of a Group I-GroupIII+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant 399 may include a solid based lubricant including at least one of lithium soap, graphite, boron nitride, molybdenum disulfide, tungsten disulfide, polytetrafluoroethylene, a metal, a metal alloy, or may be a different type.

In at least one embodiment, the lubricant 399 or damping layer 104 may provide wear resistant behavior on the annular member 100, inner component 306, outer component 302 or another component within the assembly 2. "Wear resistant behavior" may be defined as having a coefficient of friction μ of between about 0.03μ to 0.2μ between a surface of at least one of the components of the assembly 2 (annular member 100, inner component 306, outer component 302 or another component within the assembly 2) to another surface of a different component of the assembly (annular member 100, inner component 306, outer component 302 or another component within the assembly 2).

In some embodiments, the annular member 100 may be secured on one of the inner or outer components 302, 306. For example, the annular member 100 may be secured or retained by resilient gripping of the band 102 on the inner component 306. In this example, the damping layer 104 may be provided only on the inner surface of the band 102 and the projections 120 may extend radially outwardly from the band 102, e.g., toward the outer component 302. In a number of embodiments, the outer surface may not have the damping layer 104 and may therefore provide more resistance to relative motion. The annular member 100 may be prevented from undesired movement within the bore 304. The outer component 302 or inner component 306 may also be prevented from undesired within the bore 304. In some embodiments, at the surfaces of contact between the outer component 302 and the outer surfaces of the band 102, there may be sufficient frictional force to retain the annular member 100 in place relative to the outer component 302. The annular member 100 may be secured relative to the outer component 302 or inner component 306 by frictional engagement at the contact area between the band 102 and their surfaces to provide a radial compression such that very little or substantially no radial, axial, or circumferential movement takes place between the outer component 302 and the inner component 306 due to the fit of the annular member 100.

Figure 6:
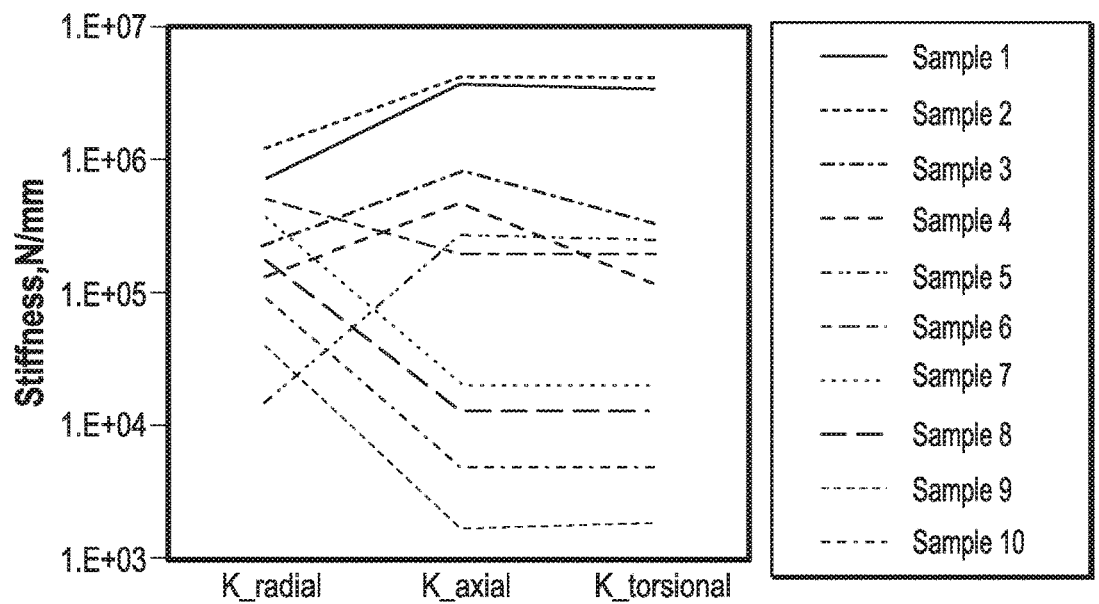
FIG. 6 is a graph of stiffness values of several prior art annular members versus several annular members constructed in accordance with the invention.

FIG. 6 shows a comparison of the axial stiffness $k_{ax}$, torsional stiffness $k_{tor}$, and a radial stiffness, $k_{rad}$ of the annular member 100 in accordance with several embodiments, compared against several known annular members 100. Radial stiffness, $k_{rad}$, of the annular member 100 may be defined herein as force change per unit displacement (N/mm) where the displacement is a radial increase of the clearance of the annular member 100 within the bore 304 between the outer component 302 and the inner component 306. Torsional stiffness, $k_{tor}$, of the annular member 100 may be defined herein as force change per unit displacement (N/mm) where the displacement is a circumferential displacement of the inner component 306 measured linearly at its outer radius $R_{IC1}$. For example, the inner component 306 may minimally rotate circumferentially during operation of the assembly 2 and the torsional stiffness $k_{tor}$, of the annular member 100 is the force change required to generate a unit displacement. Sample 1 is a Rencol™ based annular member. Sample 2 is an annular member with a perforated strip including small apertures. Sample 3 is a slotted sideless annular member 100 as shown in FIG. 3 including a plurality of projections 120 and apertures 251. Sample 4 is a sideless Rencol™ based annular member with a center slot. Sample 5 is a prior art design for an annular member. Sample 6 is a constrained layer design annular member 100 as shown in FIG. 1 including a plurality of projections. Sample 7 is a sleeved rubber annular member. Sample 8 is a sleeved rubber annular member with a plurality of apertures. Sample 9 is a foam or rubber sleeve as shown in FIG. 2. Sample 10 is a prior art design for an annular member.

As shown in FIG. 6, the use of the annular member 100 may have a torsional stiffness $k_{tor}$, and a radial stiffness, $k_{rad}$. In a number of embodiments, as shown in FIG. 6, $k_{tor} \leq 3$ $k_{rad}$. In a number of embodiments, as shown in FIG. 6, $k_{tor} \leq k_{rad}$. When compared to existing annular members, working samples, according to numerous embodiments herein, exhibit desired stiffness profiles, in relation to $k_{tor}$ and $k_{rad}$. According to numerous embodiments herein, magnetic noise may be reduced, providing for more efficient operation of the assembly. Further, according to numerous embodiments, a close fit between the inner and outer components is achieved, to reduce relative vibration between parts. Further, according to numerous embodiments, the annular member may reduce assembly forces, cost, and assembly weight.

As stated above, the projections 120 may be arranged to project away from the rim 109 to provide a plurality of discrete contact surfaces with one of the inner and outer components 302, 306. The projections 120 may be configured to deform or compress. This may include elastic deformation at the discrete contact surfaces to transmit the load force radially through the annular member 100 between the inner and outer components 302, 306. The shape and size of each projection 120 may be selected based on the particular application. In a number of embodiments, the projections 120 may be capable of transmitting relatively high radial forces (e.g., 200 N or more) to locate stably and provide radial stiffness between the inner and outer component 302, 306.

Stiffness values according to embodiments herein may be calculated by the equation $k=c \cdot m \cdot f^2$ where k is the torsional $k_{tor}$ or radial stiffness $k_{rad}$, m is the mass of the stator, c is a constant ($4\pi^2$), and f is the natural frequency of the stator. The natural frequency of the stator, f, can range based on the mode shape of the stator and the size of the motor. For example, the natural frequency of the stator, f, can be a radial 5 node (pentagonal stator) with a frequency of about 2792 Hz. In another example, the natural frequency of the stator, f, can be a radial 2 node (circular stator) with a frequency of about 368 Hz.

According to embodiments, radial stiffness $k_{rad}$, of the annular member 100 may lie within a range of 2,000 to 2,000,000, such as within a range of 80,000 to 350,000 N/mm. According to embodiments, torsional stiffness $k_{tor}$, of the annular member 100 may lie within a range of 1,000 to 1,000,000, such as within a range of 50,000 to 200,000 N/mm.

A method for testing radial stiffness $k_{rad}$, and torsional stiffness $k_{tor}$, of the annular member 100 may include the following: 1) Place two identical partial uncurled annular members clamped back to back against a central plate (mimicking the inner component 306 in an assembly 2); 2) Adjust the clamp to apply a constant amount of compression (mm) to form a clamp assembly; 3) Place clamp assembly within a tensile strength testing machine; 4) Apply a small displacement (e.g. +/−25 μm) to the central plate and record the force and displacement (of the annular members tested); 5) Calculate radial stiffness $k_{rad}$, and torsional stiffness $k_{tor}$, of the annular members by dividing change in force by change in position and multiplying to represent a full 360° annular member.

According to still another aspect, there may be provided a method including providing an inner component 306 and an outer component 302. The method may further include providing an annular member 100 between the inner component 306 and the outer component 302 wherein the annular member is radially compressed so as to exert a radial force outward onto the housing and inward onto the stator to maintain a positional relationship therebetween.

In an embodiment, the assembly 2 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the assembly 2 can be installed or assembled by an assembly force of no greater than 20 kg in a longitudinal direction to the housing 8, such as no greater than 19 kgf, no greater than 18 kgf, no greater than 17 kgf, or even no greater than 16 kgf. In a number of embodiments, the projection 120 of the annular member 100 may have a snap-in function that can reduce assembly force by a factor of 5 to 10.

In a number of variations, embodiments herein may differentiate from commonly used sliding or rotational assemblies by providing at least one of low weight and space requirements; good damping of impacts, shocks, and vibrations of the assembly; low installation and maintenance efforts; decreasing of parts or complexity of parts; smaller tolerancing requirements; less complex assembly procedures; less complex mechanisms; reduced joint stiffness; improved magnetic noise qualities; grease-free operation; or corrosion resistance.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: An electric motor or generator comprising: a stator; a housing; and an annular member fit between the stator and the housing, wherein the annular member is radially compressed so as to exert a radial force outward onto the housing and inward onto the stator to maintain a positional relationship therebetween.

Embodiment 2: The electric motor or generator assembly of embodiment 1, wherein the annular member has a torsional stiffness, $k_{tor}$, and a radial stiffness, $k_{rad}$, and wherein $k_{tor} \leq 3\, k_{rad}$.

Embodiment 3: The electric motor or generator assembly of embodiment 2, wherein $k_{tor} \leq k_{rad}$.

Embodiment 4: The electric motor or generator assembly of embodiment 1, wherein $k_{tor} < 0.8\, k_{rad}$, such as $k_{tor} < 0.5\, k_{rad}$, $k_{tor} < 0.5\, k_{rad}$, $k_{tor} < 0.3\, k_{rad}$, or $k_{tor} < 0.1\, k_{rad}$.

Embodiment 5: The electric motor or generator assembly of any of the preceding embodiments, wherein the annular member comprises a substrate layer and a damping layer overlying the substrate.

Embodiment 6: The electric motor or generator assembly of embodiment 5, wherein the substrate layer comprises a rigid material.

Embodiment 7: The electric motor or generator assembly of embodiment 5, wherein the substrate layer comprises a metal.

Embodiment 8: The electric motor or generator assembly of embodiment 5, wherein the damping layer comprises foam material.

Embodiment 9: The electric motor or generator assembly of embodiment 5, wherein the damping layer comprises an elastomeric material.

Embodiment 10: The electric motor or generator assembly of embodiment 9, wherein the annular member comprises a second substrate layer overlying the elastomeric material.

Embodiment 11: The electric motor or generator assembly of embodiment 5, wherein the damping layer comprises a polymer comprising a polyketone, a polyaramid, a polyimide, a polyetherimide, a polyamideimide, a polyphenylene sulfide, a polyphenylene sulfone, a polybenzimidazole, a derivation thereof, or a combination thereof.

Embodiment 12: The electric motor or generator assembly of embodiment 5, wherein at least one of the substrate or the damping layer comprises an annular band and a plurality of projections around the circumference of the annular band.

Embodiment 13: The electric motor or generator assembly of embodiment 12, wherein the projections face radially outward towards the housing.

Embodiment 14: The electric motor or generator assembly of embodiment 12, wherein the projections face radially inward towards the stator.

Embodiment 15: The electric motor or generator assembly of embodiment 12, wherein the annular band comprises a plurality of apertures.

Embodiment 16: The electric motor or generator assembly of embodiment 9, wherein the elastomeric material comprises rubber.

Embodiment 17: The electric motor or generator assembly of embodiment 7, wherein the metal comprises aluminum, iron, copper, titanium, or an alloy thereof.

Embodiment 18: The electric motor or generator assembly of any of the preceding embodiments, wherein the annular member is not fixed to either of the stator or the housing.

Embodiment 19: The electric motor or generator assembly of any of the preceding embodiments, wherein the annular member is fixed to at least one of the stator or the housing.

Embodiment 20: The electric motor or generator assembly of embodiment 19, wherein the assembly further comprises an adhesive adapted to fix the annular member to at least one of the stator or the housing Embodiment 21: The electric motor or generator assembly comprising: an inner member; an outer member; and an annular member disposed between the inner member and the outer member, wherein the annular member has a torsional stiffness, $k_{tor}$, and a radial stiffness, $k_{rad}$, and wherein $k_{tor} \leq 3 k_{rad}$.

Embodiment 22: The electric motor or generator assembly of embodiment 1, wherein the annular member comprises at least one axial gap extending along the axial length of the annular member.

Embodiment 23: The electric motor or generator assembly of embodiment 21, wherein the annular member includes a plurality of axial gaps thereby dividing the annular member into a plurality of annular member segments.

Embodiment 24: The electric motor or generator assembly of any of the preceding embodiments, wherein the electric motor or generator assembly comprises an alternator assembly, a drive motor assembly, a oil/water/coolant pump assembly, a steering motor assembly, a hybrid motor assembly, or a compressor assembly.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, embodiments may relate to rotational devices such as an electric motor, such as a windshield wiper motor, or axial sliding applications, such as an annular member column adjustment mechanism.

While embodiments have been shown or described in only some of forms, it should be apparent to those skilled in the art that they are not so limited, but are susceptible to various changes without departing from the scope of the invention.

The invention claimed is:

1. A electric motor or generator assembly comprising:
a stator;
a housing; and
an annular member fit between the stator and the housing, wherein the annular member is radially compressed so as to exert a radial force outward onto the housing and inward onto the stator to maintain a positional relationship therebetween, wherein the annular member has a torsional stiffness, $k_{tor}$, and a radial stiffness, $k_{rad}$, and wherein $k_{tor} \leq 3 k_{rad}$.

2. The electric motor or generator assembly of claim 1, wherein $k_{tor} \leq 2 k_{rad}$.

3. The electric motor or generator assembly of claim 1, wherein $k_{tor} \leq k_{rad}$.

4. The electric motor or generator assembly of claim 1, wherein the annular member comprises a substrate layer and a damping layer overlying the substrate.

5. The electric motor or generator assembly of claim 4, wherein the substrate layer comprises a rigid material.

6. The electric motor or generator assembly of claim 4, wherein the substrate layer comprises a metal.

7. The electric motor or generator assembly of claim 6, wherein the metal comprises aluminum, iron, copper, titanium, or an alloy thereof.

8. The electric motor or generator assembly of claim 4, wherein the damping layer comprises foam material.

9. The electric motor or generator assembly of claim 4, wherein the damping layer comprises an elastomeric material.

10. The electric motor or generator assembly of claim 9, wherein the annular member comprises a second substrate layer overlying the elastomeric material.

11. The electric motor or generator assembly of claim 4, wherein the damping layer comprises a polymer comprising a polyketone, a polyaramid, a polyimide, a polyetherimide, a polyamideimide, a polyphenylene sulfide, a polyphenylene sulfone, a polybenzimidazole, a derivation thereof, or a combination thereof.

12. The electric motor or generator assembly of claim 4, wherein at least one of the substrate or the damping layer comprises an annular band and a plurality of projections around the circumference of the annular band.

13. The electric motor or generator assembly of claim 12, wherein the projections face radially outward towards the housing.

14. The electric motor or generator assembly of claim 12, wherein the projections face radially inward towards the stator.

15. The electric motor or generator assembly of claim 12, wherein the annular band comprises a plurality of apertures.

16. The electric motor or generator assembly of claim 1, wherein the annular member is fixed to at least one of the stator or the housing.

17. The electric motor or generator assembly of claim 1, wherein the annular member comprises at least one axial gap extending along the axial length of the annular member.

18. The electric motor or generator assembly of claim 1, wherein the electric motor or generator assembly comprises an alternator assembly, a drive motor assembly, a oil/water/coolant pump assembly, a steering motor assembly, a hybrid motor assembly, or a compressor assembly.

\* \* \* \* \*

UNITED STATES PATENT AND TRADEMARK OFFICE
CERTIFICATE OF CORRECTION

| | |
|---|---|
| PATENT NO. | : 11,005,334 B2 |
| APPLICATION NO. | : 16/220464 |
| DATED | : May 11, 2021 |
| INVENTOR(S) | : Thomas Childs |

It is certified that error appears in the above-identified patent and that said Letters Patent is hereby corrected as shown below:

On the Title Page

Page 3, In Column 1, Item (56), Foreign Patent Documents, Line 11, please delete "DE 50166 A1 10/1966" and insert --DD 50166 A1 10/1966--

Signed and Sealed this
Second Day of May, 2023

Katherine Kelly Vidal
*Director of the United States Patent and Trademark Office*